United States Patent
Cantrell et al.

(10) Patent No.: US 9,017,511 B2
(45) Date of Patent: Apr. 28, 2015

(54) AIRCRAFT PROTECTION DEVICE

(71) Applicant: Airbus Operations Limited, Bristol (GB)

(72) Inventors: Martyn Cantrell, Bristol (GB); Nicholas Vitale, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/661,454

(22) Filed: Oct. 26, 2012

(65) Prior Publication Data

US 2013/0108828 A1    May 2, 2013

(30) Foreign Application Priority Data

Oct. 27, 2011    (GB) .................................... 1118553.5

(51) Int. Cl.
*B65H 81/00*    (2006.01)
*B64F 1/00*    (2006.01)

(52) U.S. Cl.
CPC ...................... *B64F 1/005* (2013.01)

(58) Field of Classification Search
CPC ......... B64F 1/005; B64C 1/062; B64C 1/064; B64C 1/065; B64C 3/182; B64C 3/185; B64C 3/20; B29C 70/86; B29C 53/56; B29C 53/58; B29C 53/582
USPC ......... 156/169, 171, 172, 184, 185, 187, 188, 156/190, 195, 173, 174, 193, 293, 294; 244/121
See application file for complete search history.

(56) References Cited

U.S. PATENT DOCUMENTS

| | | | |
|---|---|---|---|
| 6,401,258 B1 | 6/2002 | Wilson | |
| 2002/0006523 A1* | 1/2002 | Obeshaw | 428/593 |
| 2006/0234007 A1* | 10/2006 | Durand et al. | 428/122 |
| 2008/0087768 A1* | 4/2008 | Lloyd | 244/123.1 |
| 2008/0308669 A1 | 12/2008 | Lloyd | |

FOREIGN PATENT DOCUMENTS

| | | |
|---|---|---|
| DE | 43 13 592 | 10/1994 |
| DE | 197 00 091 | 7/1998 |

OTHER PUBLICATIONS

Search Report for GB 1118553.5 dated Feb. 15, 2012.
Extended European Search Report dated Mar. 6, 2013 in EP 12187065.3-1754.

* cited by examiner

*Primary Examiner* — Philip Tucker
*Assistant Examiner* — Carson Gross
(74) *Attorney, Agent, or Firm* — Nixon & Vanderhye P.C.

(57) ABSTRACT

The invention relates to an aircraft protection device for protecting potentially exposed aircraft structures from direct impacts and a method of protecting an exposed edge of an aircraft component. The method includes the steps of winding filament around a foam core to create an impact protection device. A portion of the filament winding and foam core is removed from the impact protection device to create a receiving section whereby the receiving section is configured to correspond to and receive the exposed edge of the aircraft component. The impact protection device is secured to the exposed edge of the aircraft component such that the exposed edge is received in the receiving portion of the impact protection device.

7 Claims, 3 Drawing Sheets

AIRCRAFT PROTECTION DEVICE

This application and claims priority to GB 1118553.5 filed 27 Oct. 2011, the entire contents of which is hereby incorporated by reference.

BACKGROUND OF THE INVENTION

The present invention concerns protecting components of an aircraft from damage. More particularly, but not exclusively, this invention concerns an apparatus and method for protecting components of an aircraft from accidental damage, for example during the maintenance of the aircraft.

Many aircraft components are made from composite laminate materials. For example, a stringer in an aircraft wing, stiffeners and spar structures, may all be in the form of composite laminate structures. While the structures may be strong when loaded in the way in which they have been designed to be loaded, they may be vulnerable to impact damage, which may result in delamination occurring. Delamination may result in the structure weakening and eventually failing. Particularly vulnerable are the planar end faces of composite laminate structures where an impact occurs, particularly if the impact is end-on (i.e. when the impact is in a direction perpendicular to the end face and parallel to the plane of the laminates that make up the structure). It will be understood that the planar end face is the surface at which the layers of the composite laminate structure terminate and that the normal axis of the end face is typically parallel to the direction in which the composite laminate structure extends from the end face. If an impact has a significant component of force in the end-on direction the impact may be capable of damaging the bonding between the laminate's layers comprising the composite laminate structure and causing, or adding to the effect of, delamination. Such impacts may be as a result of workmen dropping tools whilst working on the structure of an aircraft, for example during maintenance when the end surfaces of the composite laminate structures are exposed in a way they are usually not. A further way in which the composite laminate structures may be damaged is as a result of wear over time, such wear for example resulting from workmen sitting, or standing, on the structure or contacting the structure directly or by means of tools, or other equipment. It is for example possible for a workman to rest tools or toolboxes on the end surface of such structures while working on the aircraft. The planar end face of a composite laminate structure is typically exposed, at least during maintenance, to direct wear and direct impacts as described above.

Various techniques for protecting aircraft components from impact damage are known. US 2008/0308669 and US 2008/0087768 both disclose impact protection devices for protecting the end surfaces of aircraft components.

The present invention seeks to mitigate the above-mentioned problems. Alternatively or additionally, the present invention seeks to provide an improved method and apparatus for protecting aircraft components from damage.

SUMMARY OF THE INVENTION

According to a first aspect, the invention provides a method of protecting an exposed edge of an aircraft component, the method comprising the steps of:
winding filament around a foam core to create an impact protection device;
removing a portion of the filament winding and foam core from the impact protection device to create a receiving section, whereby the receiving section is configured to correspond to and receive the exposed edge of the aircraft component; and
securing the impact protection device to the exposed edge of the aircraft component such that the exposed edge is received in the receiving portion of the impact protection device.

The filament winding of the impact protection device may act as a rigid shell to at least partially deflect impacts that would otherwise be incident on the exposed edge of the aircraft component. The foam core of the impact protection device may act to at least partially absorb impacts that would otherwise be incident on the exposed edge of the aircraft component.

An exposed edge of an aircraft component is any end face of an aircraft component that, but for the presence of the impact protection device, would be directly exposed to potential impacts from foreign bodies. The exposure to direct impacts may be during the maintenance of the aircraft when the said aircraft component is exposed by the removal of a maintenance panel or similar. The exposed edge may present a flat end surface or a curved end surface. The receiving portion of the impact protection device may be configured to correspond to the shape of the end surface of the exposed edge of the aircraft component. The receiving portion may present a flat mating surface to a flat end surface of the exposed edge of the aircraft component. The receiving portion may present a curved mating surface to a curved end surface of the exposed edge of the aircraft component. The receiving portion may present a mating surface shaped to correspond with the shape of the end surface of the exposed edge of the aircraft component. The impact protection device may be secured to the exposed edge such that there is no free space between the mating surface of the receiving portion and the end face of the exposed edge of the aircraft component.

The step of winding filament around a foam core to create an impact protection device may include applying resin to the filament. The resin may be cured to create the impact protection device. The resin may be epoxy resin or any other suitable resin. The filament winding may comprise a rigid shell at least partially surrounding the foam core.

The step of winding filament around a foam core may be preceded by a step of applying an adhesive film to the foam core. The adhesive film may fully or partially bond the filament to the foam core.

The filament may comprise glass fibres, carbon fibres, aramid fibres or any other suitable fibres. The filament may be the form of a tape.

The step of removing a portion of the filament winding and foam core may comprise machining the impact protection device.

The foam core may be Rohacell® XT, available from Evonik Industries AG, Performance Polymers, 64293 Darmstadt, Germany, or any other suitable foam. Preferably, the foam core is suitable for use in high temperature and/or high pressure environments. The foam core may comprise closed cell foam.

The impact protection device may be secured to the exposed edge of the aircraft component mechanically or adhesively.

A second aspect of the invention provides a method of manufacturing an impact protection device for protecting the exposed edge of an aircraft component, the method comprising the steps of:
winding filament around a foam core; and removing a portion of the filament winding and foam core, thereby forming a receiving section for an exposed edge of an aircraft component.

A third aspect of the invention provides an impact protection device for protecting the exposed edge of an aircraft component comprising:
a foam core;
a rigid shell at least partially surrounding the foam core; and
a receiving section configured to receive an exposed edge of an aircraft component.

The receiving section may be a simple mating surface configured to be joined to the exposed edge of an aircraft component mechanically or adhesively. The receiving section may be configured to partially surround the exposed edge of an aircraft component. The rigid shell may comprise a composite material. The rigid shell may comprise a filament winding. The rigid shell may comprise a sheet or mat of composite laminate material laid over the foam core. The rigid shell may be constructed using advance fibre placement. The receiving section may be formed by removing a portion of the rigid shell or foam core.

A fourth aspect of the invention provides an impact protection device for protecting the exposed edge of an aircraft component, the impact protection device formed by either method as described above.

A fifth aspect of the invention provides an impact protection device and associated aircraft component, the impact protection device and associated aircraft component formed by the method as described above.

A sixth aspect of the invention provides an aircraft, the aircraft comprising an aircraft component and associated impact protection devices as described above.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
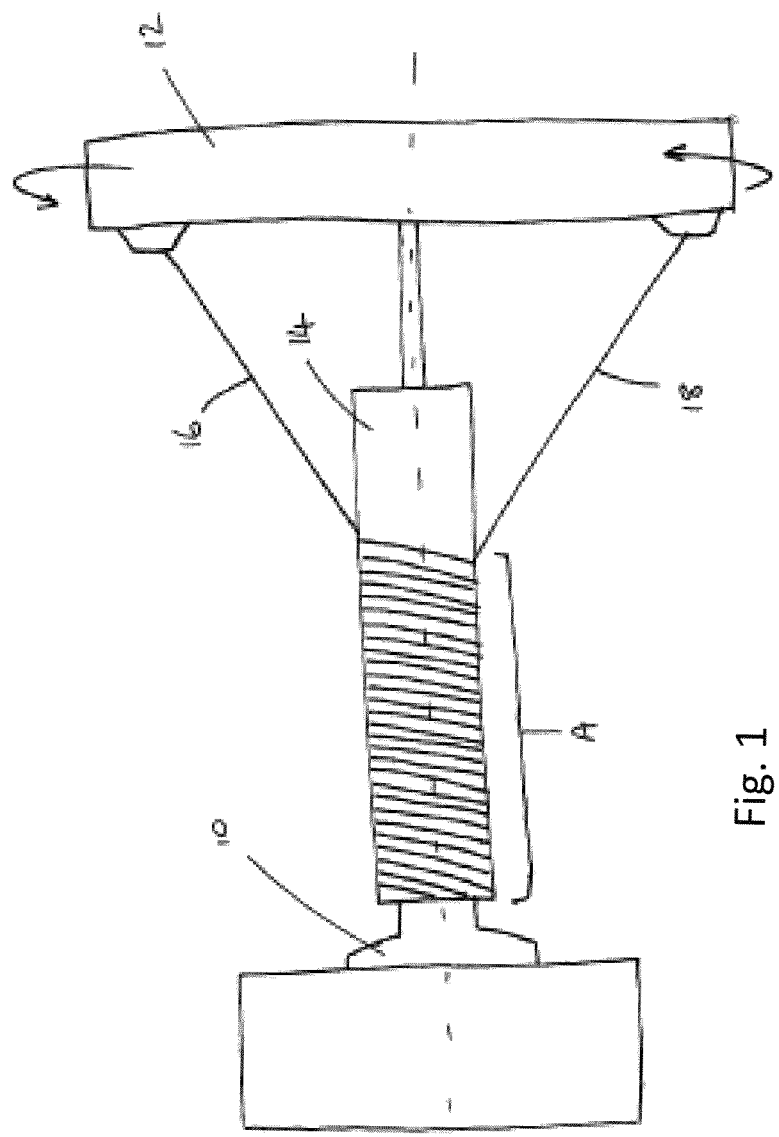
FIG. 1 shows a filament winding process according to a first embodiment of the invention.

FIG. 1 shows a filament winding process according to a first embodiment of the invention. An axle 10 is rotatably mounted to a thread wheel 12. A foam core 14 is associated with the axle 10. The thread wheel 12 includes a first filament 16 and second filament 18 arranged such that rotation of the thread wheel 12 around the axle 10 causes the first filament 16 and second filament 18 to wind around the foam core 14, as indicated by section A of FIG. 1. The thread wheel 12 is rotated until the length of the foam core 14 is entirely wrapped in the first filament 16 and second filament 18. Resin may be added to the winding as it progresses along the foam core 14 or added once the winding is complete. In an alternative embodiment, the foam core may be at least partially covered in an adhesive layer, the adhesive layer arranged to at least partially bond to the filament winding 16, 18. The foam core 14, the filament winding 16, 18, and the resin is then cured using standard techniques to produce an impact protection device with a rigid, cured, filament wound outer shell and a foam core. In this embodiment, the foam core 14 has a square cross section. However, the foam core may have a cross section of any suitable shape, for example circular, semi-circular, triangular, or otherwise. The shape of the cross section may be chosen to optimise the impact protection provided by the impact protection device. For example, the impact protection device may be shaped to deflect impacts in addition to, or instead of, absorbing impacts.

Following the curing process, the impact protection device is machined to remove a partial section of the impact protection device. The section removed is such that a receiving portion is created, the receiving portion configured to correspond to, and receive, an exposed edge of an aircraft component.

A simple form of filament winding has been described for ease of understanding. The person skilled in the art will be familiar with filament winding techniques and will appreciate that the winding process may include a more complex winding pattern.

Figure 2:
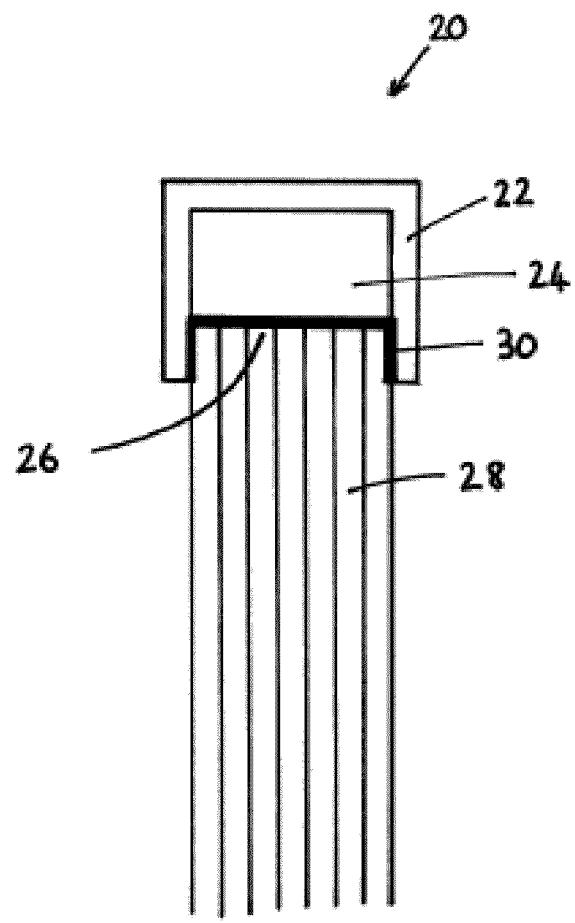
FIG. 2 shows a cross-sectional view of an aircraft component and impact protection device according to a second embodiment of the invention.

FIG. 2 shows an embodiment of the invention applied to an exposed edge of an aircraft component. An impact protection device 20 has been created by filament winding around a foam core with an approximately square cross section. A receiving portion has been created by machining the face of the filament wound outer shell 22 along with a portion of the foam core 24. The receiving portion is configured to correspond to, and receive, the exposed end face 26 of an aircraft component 28. The aircraft component 28 comprises a plurality of laminate layers, the laminate layers terminating at the end face 26. The end face 26, if unprotected, would be vulnerable to delamination in the event of a direct impact on the end face. This may lead to the failure of the aircraft component 28, or at least lead to increased maintenance time when the aircraft is on the ground.

The impact protection device 20 is mounted over the exposed end face 26 of the aircraft component 28 and secured by adhesive bonding 30. The outer shell 22 of the impact protection device 20 may act to deflect impacts that would otherwise be directly incident on the end face 26. The foam core 24 may act to absorb the force of impacts that would otherwise be directly incident on the end face 26.

Figure 3:
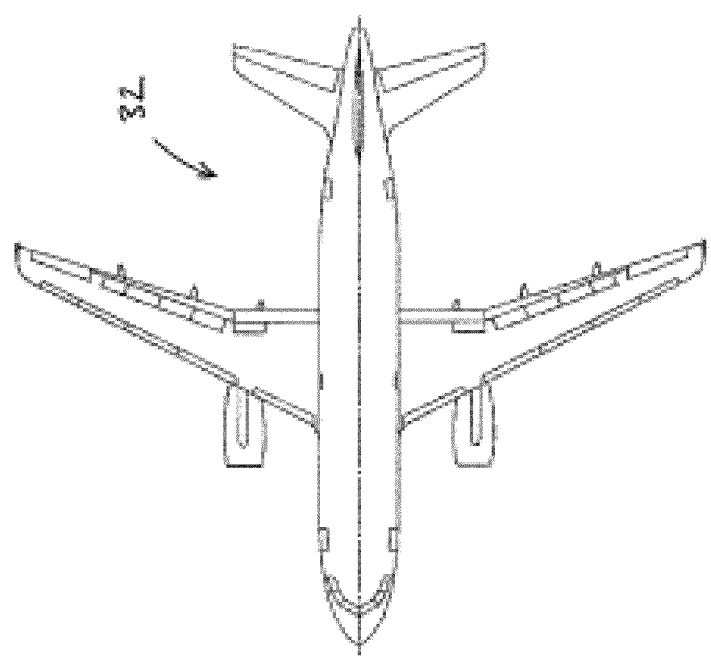
FIG. 3 shows an aircraft, the aircraft comprising an impact protection device and associated aircraft component according to an embodiment of the invention.

FIG. 3 shows an aircraft 32, the aircraft comprising an aircraft component and impact protection device as described in FIG. 1 or FIG. 2.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The impact protection device may be mechanically mounted to the aircraft component. The mechanical mounting may be screws or bolts. The mechanical mounting may be the interaction of complimentary mechanical formations on the impact protection device and aircraft component, for example a protrusion and groove arrangement. The method of manufacturing the impact protection device may comprise the step of laying one or more fibre mats over a foam core as an alternative to filament winding. The method of manufacturing the impact protection device may comprise the step of advanced fibre placement as an alternative to filament winding.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of protecting an exposed edge of an aircraft component, the method comprising the steps of:
    winding filament around a foam core to create an impact protection device;
    removing a portion of the filament winding and foam core from the impact protection device to create a receiving section, whereby the receiving section is configured to correspond to and receive the exposed edge of the aircraft component; and
    securing the impact protection device to the exposed edge of the aircraft component such that the exposed edge is received in the receiving portion of the impact protection device.

2. A method as claimed in claim 1, the step of winding filament around a foam core to create an impact protection device including applying resin to the filament.

3. A method as claimed in claim 2, comprising the step of the resin being cured to create the impact protection device.

4. A method as claimed in claim 1, the step of removing a portion of the filament winding and foam core comprising machining the impact protection device.

5. A method as claimed in claim 1, wherein the impact protection device is secured to the exposed edge of the aircraft component adhesively.

6. A method as claimed in claim 1, wherein the impact protection device is secured to the exposed edge of the aircraft component mechanically.

7. A method of manufacturing an impact protection device for protecting the exposed edge of an aircraft component, the method comprising the steps of:
    winding filament around a foam core; and
    removing a portion of the filament winding and foam core, thereby forming a receiving section for an exposed edge of an aircraft component.

* * * * *